March 28, 1967  W. GRUEN ETAL  3,311,109
SPIROMETER
Filed June 5, 1964  2 Sheets-Sheet 1
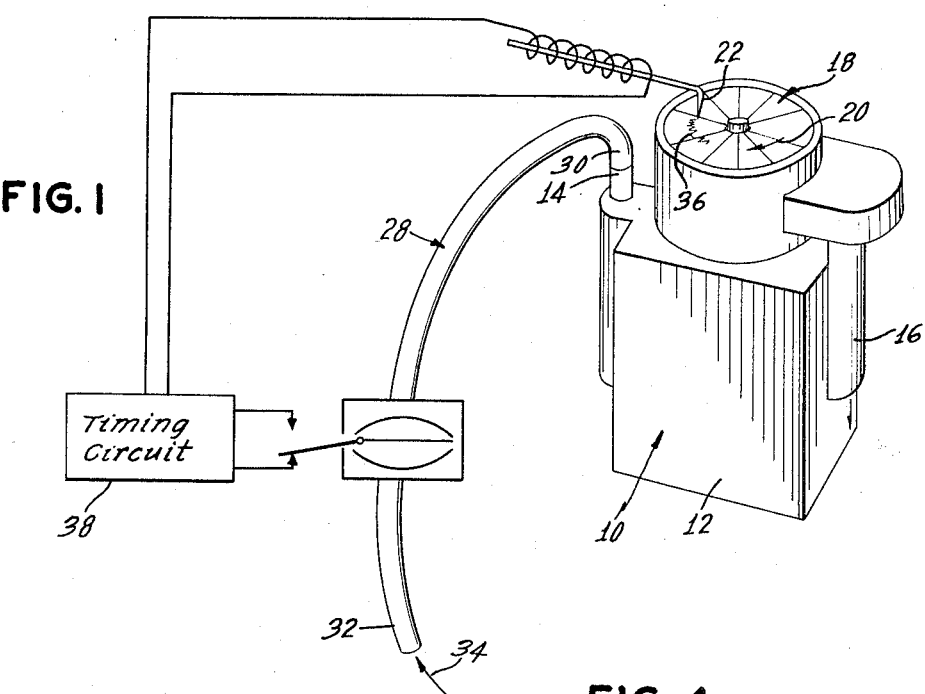
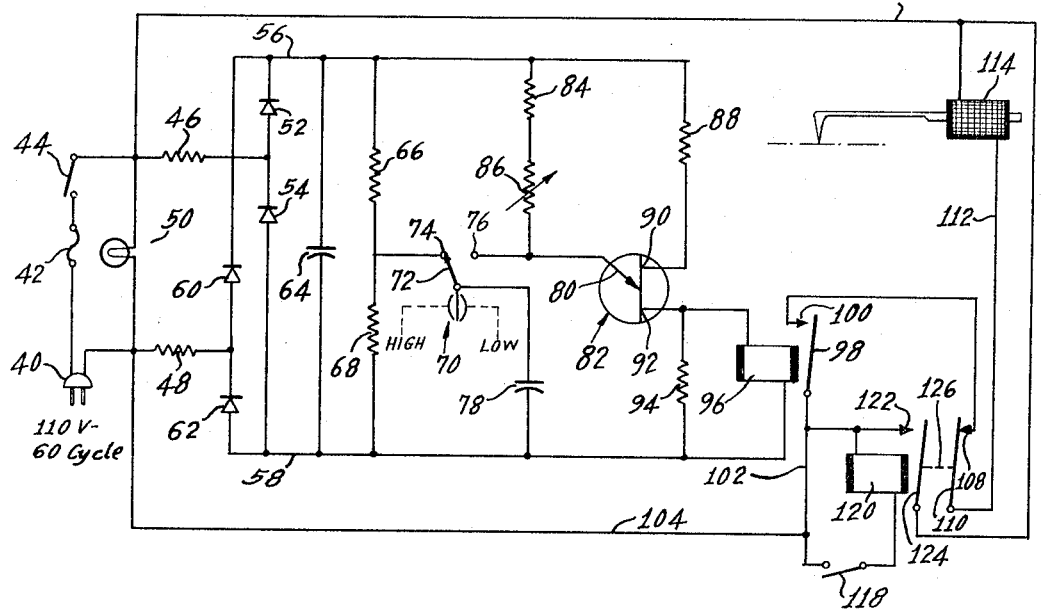
INVENTORS
WILLIAM GRUEN, BURT B. ORDEN
& WILLIAM E. HOVEMEYER
BY
Edwin Levinson & Henry R. Emer
ATTORNEYS March 28, 1967 W. GRUEN ETAL 3,311,109
SPIROMETER Filed June 5, 1964 2 Sheets-Sheet 2

INVENTORS
WILLIAM GRUEN, BURT B. ORDEN
& WILLIAM E. HOVEMEYER
BY
Edwin Levinson
Henry R. Lerner
ATTORNEYS United States Patent Office 3,311,109
Patented Mar. 28, 1967

3,311,109
SPIROMETER
William Gruen, New York, and Burt B. Orden, Bronx, N.Y., and William E. Hovemeyer, Convent Station, N.J., assignors to Instrumentation Associates Inc., New York, N.Y., a corporation of New York
Filed June 5, 1964, Ser. No. 372,822
6 Claims. (Cl. 128—2.08)

The present invention relates to spirometers for recording the respirations of a patient's lungs.

Various types of spirometers are known in the prior art. One such type provides an arrangement which results in a volumetric indication of the vital capacity of a patient which may be read from an index scale. A limitation of such a device is that it provides means for measuring only the total quantity of air which can be exhaled known as the vital capacity, after a maximum inspiration or inhalation and gives no measurement of the time factor involved nor indications of variation in the volume of air discharged with respect to time during the act of exhalation.

In attempting to overcome the foregoing limitations of the simple indexing indicator type of spirometer, there was developed a recording device in which, incident to a single act of exhalation, there was produced a record of such exhalation in terms of both air exhaled and time elapsed from the beginning to the end of the exhalation In order to determine the volume of air exhaled during any time interval, it was necessary to compare the record with a calibration chart.

The necessity to use a calibration chart is a severe limitation to the utilization of the foregoing recording device. It has now been found to be of great importance, for example during an operation or a metabolism test, to obtain an immediate and direct indication of the volume of exhalation during the very first time interval after commencement of the exhalation and direct indications of each such volume during each succeeding time interval of a single exhalation Under such circumstances, calibration charts are of little use.

In view of the foregoing, it is an object of the present invention to provide a recording device for a spirometer which will provide an immediate record of the volume of air exhaled, per unit of time, during each individual exhalation of the patient.

It is another object of the present invention to provide a recording device for a spirometer which will provide an indication of the variations in rate of exhalation during a single exhalation.

It is a further object of the present invention to provide a recording device for a spirometer which will provide a record having timing indications and in which the very first time interval indication will be exactly the same as each subsequent time interval indication.

It is a still further object of the present invention to provide a generally improved and highly efficient timing circuit for a spirometer or the like.

Other and further objects and advantages of the present invention will become apparent to one skilled in the art from a consideration of the following specification taken in connection with the appended drawings.

In the drawings, which illustrate the best mode presently contemplated for carrying out the invention:

FIG. 1 is a more or less schematic illustration of a spirometer pursuant to the present invention;

FIG. 4 is a schematic diagram of a timing circuit utilized in the spirometer of the present invention.

Figure 2:
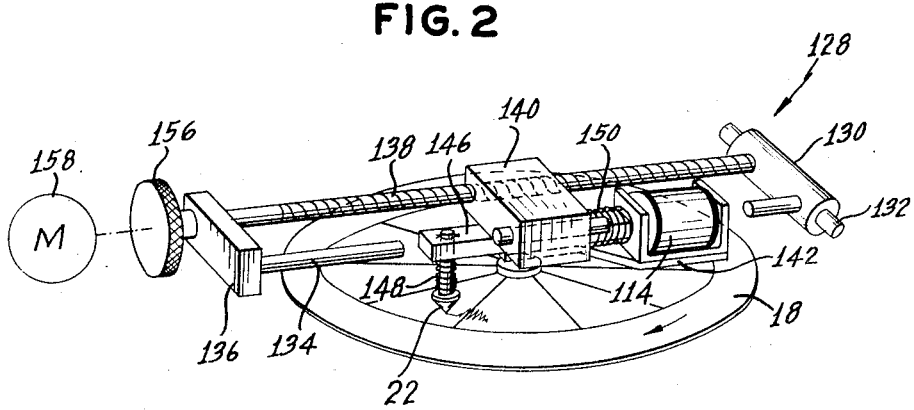
FIG. 2 illustrates the recording mechanism.

Referring now to the drawings in detail, and in particular to FIG. 1, there is shown a spirometer 10, pursuant to the present invention. As here shown, the spirometer 10 comprises a conventional air chamber 12 having an air inlet 14 and an air outlet or exhaust 16. It will be understood that the chamber 12 contains conventional apparatus to effect the rotation of a spindle in response to the passage of air through the chamber 12 from inlet 14 to exhaust 16. The spindle is adapted to impart its rotational movement to a conventional record disk 18, as indicated by arrow 20, relative to a stylus 22.

Figure 3:
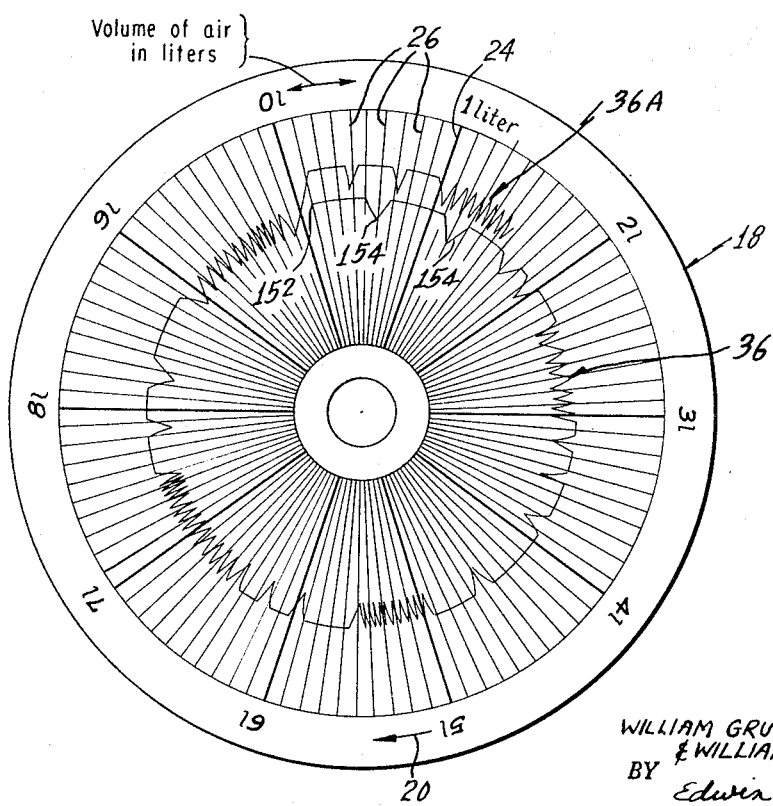
FIG. 3 illustrates a recording made with a spirometer pursuant to the present invention.

As best shown in FIG. 3, the record disk 18 is calibrated in suitable units, for example and not by way of limitation, the unit may be liters. In the present instance, the record disk has ten radial indicia 24, each designating one liter, and it will be noted that these indicia bear the numerical designations of zero through nine, to provide the possibility of recording ten liters during a 360° rotation of the record disk. The disk 18 is calibrated also in tenths of a liter, it being noted that there are ten radial indicia 26 between each pair of radial indicia 24.

In practice, an air conduit 28 is connected at one end 30 thereof to the inlet 14 and the other end 32 thereof is provided with a conventional mouthpiece or mask, neither of which is shown. The patient exhales into conduit 32, as indicated by the arrow 34 and, in conventional manner, for each exhalation, there will be a corresponding rotation of the disk 18 to provide a recording 36 which heretofore indicated only the total volume of air exhaled during each exhalation by the patient.

It has now been found that physicians require more information than merely a record of the total volume of air for each exhalation. More specifically, it is of extreme importance for the physician to know the variation in the rate of exhalation during each complete exhalation, or an indication of the change of volume of exhaled air per unit of time. In this connection, it is essential that the physician obtains a direct record of the volume of air exhaled by the patient during the very first time interval as well as during each succeeding time interval for each complete exhalation. This will provide him not only with a record of the total volume of air exhaled during each exhalation but will also provide a record of volume exhaled during each time interval. By comparing the change in volume for each time interval, the physician can obtain a comparison of volume per unit of time and consequently he will have a measurement of the rate of exhalation as well as an indication of a change or variation in such rate.

For this purpose, there is provided a timing circuit 38 which is effective to provide timing indications or pulses in the recording 36, as hereinafter described in detail. As here shown, the timing circuit 38 is constituted by a relaxation oscillator which is so biased that upon initiation of its operation a timing pulse appears on the record and succeeding timing pulses appear at regular time intervals, for example and not by way of limitation, the pulses appear every quarter second. The circuit is so biased that the first time interval, i.e. the interval between the first pulse and the second pulse is exactly the same as each succeeding time interval. As here shown, the timing circuit 38 is adapted to be operated from a 110 volt-60 cycle alternating current supply, being provided with a plug, one terminal of which is connected through a fuse 42 and an "ON-OFF" switch 44 to a resistor 46. The other plug terminal is connected to a resistor 48. An "ON" pilot light 50 is connected across one end of resistors 46 and 48. The other end of resistor 46 is connected between the diodes 52 and 54, diode 52 being connected to wire 56 and diode 54 being connected to wire 58. Diodes 60 and 62 are also connected between wires 56 and 58, the other end of resistor 48 being connected between said latter diodes. It will be understood that the four diodes provide the necessary rectifications to develop a D.C. voltage across the filter capacitor 64 and the voltage divider 66 and 68 connected in parallel with the capacitor between wires 56 and 58. In the present embodiment there is developed a D.C. voltage of 23 volts.

Pursuant to a highly novel aspect of the present invention a differential air pressure switch 70 is inserted into the air conduit 28. The movable switch element 72 is engaged with switch contact 74 when there is no air flow in the air conduit 28 and engages switch contact 76 in response to air flow in the conduit. Movable switch arm 72 is connected to one end of a timing capacitor 78, the other end of which is connected to wire 58. Consequently, it will be apparent that when there is no air flow in line 28 capacitor 78 is connected across resistor 68 so as to be charged by the output of the rectifiers. In the present embodiment capacitor 78 is charged to 17 volts. The other switch contact 76 is engaged by switch member 72 when air flows in line 28, switch contact 76 is connected to the emitter 80 of a unijunction transistor or double base diode 82. Fixed resistor 84 and variable resistor 86 connected between wire 56 and emitter 80 comprise a variable time discharge circuit for capacitor 78 when switch 70 is closed at contact 76. Resistor 88 is connected between wire 56 and base two, indicated by reference numeral 90, of transistor 82 to supply a positive voltage to said base. Transistor base one, indicated by reference numeral 92 is connected to one end of load resistor 94, the other end of which is connected to wire 58. Winding 96 of a pulse relay is connected across load resistor 94.

With a switch 70 closed at contact 76, the timing circuit 38 acts as a conventional relaxation oscillator. This occurs as soon as air begins to flow in the air line 28. Such air flow commences as the patient begins to exhale into line 28. However, with no air flow in the line, switch 70 is closed at contact 74 and capacitor 78 is biased or charged to 17 volts, which is the voltage developed across the bias resistor 68. This bias voltage represents the peak voltage, $V_p$, of transistor 82. When switch 70 is closed at contact 76 in response to the beginning of exhalation, the bias voltage is applied to emitter 80 and appears between the emitter and base one, 92. Since this represents the peak voltage of the transistor, the latter fires, provided the emitter current is above a predetermined level. When the transistor fires, a pulse is developed across the load resistor 94 and capacitor 78 discharges through current flow from emitter 80 to base 92 junction and across the load resistor 94. When the capacitor voltage reaches a low point of two volts, in the present embodiment, the transistor ceases to conduct. The capacitor again charges, now charging through resistors 84 and 86. The time required for capacitor 78 to recharge, in the present embodiment is ¼ second. Consequently the pulses continue to appear across resistor 94 every ¼ second until there is no air flowing in the spirometer breathing tube 28. When there is no airflow, switch 70 closes at contact 74 and capacitor 78 recharges through bias resistors 66 and 68 to the transistor firing voltage. Consequently, when air reappears in the breathing tube 28, in response to the patient's exhalation, the bias voltage across capacitor is immediately applied to the transistor emitter. Due to the fact that capacitor 78 is always charged, even when there is no air flow in breathing tube 28, to the transistor firing voltage, there is no delay in the timing of the first pulse since there is no time loss involved in charging capacitor 78, which would be the case in the conventional relaxation oscillator in which the timing capacitor is normally discharged and begins to charge when the circuit begins to operate. As a result there is no delay in the appearance of the first pulse, said first pulse appearing with the start of exhalation into the breathing tube. The time interval of this first pulse is extremely important especially when only a few intervals are measured and the time between each is significant. It will be noted that capacitor 78 does not lose its charge when the switch element 72 moves from contact 74 to contact 76 because the capacitor is not connected during this movement and, in addition, it has a low internal leakage.

Each time the winding 96 is pulsed, the relay armature 98, which is normally disengaged from contact 100, engages the latter. Armature 98 is connected by wires 102 and 104 to one terminal of plug 40. Switch contact 100 is connected by wire 106 to contact 108 which is normally engaged with movable relay element 110. Element 110 is connected by wire 112 to one end of a solenoid 114. The other end of solenoid 114 is connected to wire 116 which is connected to the other terminal of plug 40. Consequently, when solenoid 96 is pulsed by the oscillator circuit 38, the solenoid 114 is connected across the source for the duration of the pulse. Solenoid 114, as hereinafter described in detail, is operable to drive the stylus 22 to provide a time pulse on the record 18.

In lieu of operating the circuit 38 to generate an initial time pulse and succeeding time pulses, the circuit can be operated to generate the first pulse, as usual, at the start of a time interval, and no succeeding pulses. For this purpose, provision is made for switch 118 which is connected between wire 104 and one end of relay solenoid 120. The other end of the solenoid is connected to wire 102 and to a stationary contact 122. Armature switch element 110 and a second armature switch element 124 are both operated by the armature 126 of relay solenoid 120. Consequently, when switch 118 is closed, one end of solenoid 120 is connected to A.C. line 104. Upon the occurrence of the first pulse across solenoid 96, switch contacts 98 and 100 close to connect the other end of relay 120 to the other A.C. line 116 through wire 106, closed contacts 108–110, wire 112 and solenoid 114. This energizes the solenoid 20 so that contacts 108–110 open and contacts 122–124 close. When the latter close, there is provided a holding circuit for the solenoid 120 since closed contacts 122–124 connect to the A.C. line 116. With the contacts 108–110 open the stylus drive solenoid 114 remains de-energized so that timing pulses are not applied to the stylus 22.

Referring now to FIG. 2 in detail, it will be noted that provision is made for mounting the stylus 22 above the record 18. A frame work, generally indicated at 128, is suitably mounted above the record disk 18. The frame work includes a support member 130 mounted by a strut 132 suitably mounted on the spirometer 10. A rod 134 interconnects member 130 with an end plate 136. A worm 138 is mounted for rotation by the support 130 and end plate 136. A block 140 is threaded on the worm or screw 138. Block 140 mounts a support 142 for the stylus drive solenoid 114. Stylus 22 is mounted by a pen carrier 146 and biased by spring 148 into engagement with the record disk 18. The pen carrier is slidably mounted on the block 140 and is biased toward the left, viewing FIG. 2, by the spring 150. It will be understood that the carrier 146 is coupled to the armature of solenoid 114. Upon energization of the latter by an output timing pulse of the timing circuit 38, as previously described, the solenoid armature is moved to the right viewing FIG. 2, so as to move the carrier 146 in said direction against the bias of spring 150. Upon de-energization of the solenoid 114, after the output pulse has passed, the stylus is moved back to the left by spring 150. As a result, the stylus 22 is moved in opposite radial directions on record 18 to provide a timing pulse record in response to each pulse output of the timing circuit 38.

In record 18, shown in FIG. 3, volume of air is indicated by the extent of angular rotation of the record, represented by the circular lines. The radial lines do not represent, as such, another coordinate axis for the graphic record. These radial lines serve to divide the circular lines into suitable subdivisions so that the volume axis, defined by angular rotation, can be conveniently calibrated. As shown in FIG. 3, record 18 has been calibrated so that an angular displacement of 360° represents a volume of 10 liters, and, correspondingly, an angular displacement of 36° represents 1 liter. The time element is provided by the pulses of equal time intervals, to provide a direct way to visually ascertain the rate of air exhalation and the change in this rate.

Referring now to FIG. 3 in detail, there is shown an example of a recording 36 made on a record 18 pursuant to the invention. The record rotates in the direction of the arrow 20 relative to the stylus 22. When the patient begins to exhale into the breathing tube 28, the switch 70 immediately operates to produce the first radial timing pulse 152. There is no delay in the production of this first timing pulse since the pen 22 is operated radially of the record 18, as previously described, upon inception of the exhalation. The succeeding timing pulses appear at ¼ second intervals, as indicated at 154. The distance between successive pulses indicates the volume of air exhaled during each time interval. For example between pulse 152 and pulse 154, 6/10 of a liter of air has been exhaled during the first ¼ second. The same volume of air has been exhaled during the second ¼ second. However, the volume has decreased during each succeeding ¼ second. Consequently, the record 36 clearly indicates the amount of air exhaled during each time interval, especially the important first time intervals. By comparing the changes in volume during succeeding intervals, the rate of exhalation or change of such rate during different time intervals can be ascertained. The records can be retained for comparison of different records at different periods.

The thread 138 is coupled to a drive motor 158 by means of the knob 156. The drive motor is operative to cause one rotation of screw 138 after each 360° rotation of the record 18. As a result, the stylus 22 is moved partially toward the left viewing FIG. 2, for a distance greater than the amplitude of the timing pulse recordings, 152, 154. As a result, a second recording 36A is made concentrically outwardly of the recording 36. Consequently, it will be apparent that if the recording starts at the center of the record, it will continue in concentric circles outwardly of the center so as to utilize the entire surface of the disk 18.

From the foregoing, it will be apparent that there has been illustrated and described a highly novel spirometer. Various changes may be made therein without however departing from the inventive concept of the present invention, as set forth in the appended claims.

Having thus described our invention, what we claim and desire to secure by Letters Patent is:

1. A spirometer having a stylus, means to move a recording chart relative to said stylus in response to the exhalation of air into the spirometer for marking a line on said chart in accordance with the volume of said air, and means to reciprocably move said stylus at fixed time intervals transversely of said line, said last mentioned means including means to effect an initial transverse movement of said stylus substantially simultaneously with the commencement of such exhalation, said last mentioned means being an oscillator timing circuit having a discharge circuit which is biased to a predetermined voltage in the absence of exhaled air in said spirometer and which biased voltage is discharged in immediate response to said commencement of exhalation.

2. A spirometer having a stylus, means to rotate a disk record relative to said stylus in response to the exhalation of air into the spirometer for marking a circular line on said record in accordance with the volume of said air, and means to reciprocally move said stylus at predetermined time intervals radially of said line, said last mentioned means including means to effect an initial radial movement of said stylus substantially simultaneously with the commencement of such exhalation, said last mentioned means being an oscillator timing circuit having a discharge circuit which is biased to a predetermined voltage in the absence of exhaled air in said spirometer and which biased voltage is discharged in immediate response to said commencement of exhalation.

3. A spirometer having a stylus, means to move a record relative to said stylus in response to the exhalation of air into the spirometer for marking a line on said record in accordance with the volume of air, and a timing circuit operable to pulse said stylus at predetermined spaced equal time intervals to provide timing pulses on said line, said timing circuit being normally inoperative, and air pressure switch means operable in response to said exhalation of air to render said timing circuit operative.

4. A spirometer having a stylus, means to move a record relative to said stylus in response to the exhalation of air into the spirometer for marking a line on said record in accordance with the volume of air, a timing circuit operable to pulse said stylus at predetermined spaced time intervals to provide timing pulses on said line, said timing circuit being normally inoperative, air pressure switch means operable in response to said exhalation of air to render said timing circuit operative, said timing circuit being oeprative in response to the discharge of a predetermined stored voltage, and means to maintain said stored voltage in the absence of said exhalation, said air pressure switch being effective to discharge said stored voltage in response to said exhalation of air.

5. A spirometer having an air chamber, a stylus, means to move a record relative to said stylus in response to the exhalation of air into said chamber for marking a line on said record in accordance with the volume of said air, a breathing tube in air flow relation with said chamber, timing circuit means operable to pulse said stylus at predetermined time intervals to provide timing pulses on said line, air pressure switch means provided in said conduit for operating said timing circuit, said timing circut having a relaxation oscillator operable in response to the charge and discharge of a capacitor, means to bias said capacitor to a predetermined voltage in the absence of air flow in said breathing tube, and said switch being operable to effect the discharge of said capacitor upon exhalation of air into said breathing tube.

6. A spirometer having an air chamber, a stylus, means to move a record relative to said stylus in response to the exhalation of air into said chamber for marking a line on said record in accordance with the volume of said air, a breathing tube in air flow relation with said chamber, timing circuit means operable to pulse said stylus at predetermined time intervals to provide timing pulses on said line, air pressure switch means provided in said conduit for operating said timing circuit, said timing circuit having a relaxation oscillator operable in response to the charge and discharge of a capacitor, means to bias said capacitor to a predetermined voltage in the absence of air flow in said breathing tube, said switch being operable to effect the discharge of said capacitor upon exhalation of air into said breathing tube, said relaxation oscillator having a unijunction transistor, said capacitor being charged to the firing voltage of said transistor in the absence of said air flow and being out of circuit with said transistor in said absence of air flow, and said switch being operable to connect said capacitor in circuit with said transistor upon said exhalation of air into said breathing tube.

References Cited by the Examiner

UNITED STATES PATENTS

| | | | |
|---|---|---|---|
| 2,192,799 | 3/1940 | Perrill | 128—2.07 |
| 2,687,128 | 8/1954 | Fleisch | 128—2.07 |
| 2,837,083 | 6/1958 | Lanooy | 128—2.08 |
| 2,999,495 | 9/1961 | Shipley | 128—2.08 |
| 3,026,868 | 3/1962 | Weinberg | 128—2.08 |

RICHARD A. GAUDET, *Primary Examiner.*

SIMON BRODER, *Examiner.*